(12) United States Patent
Hammer et al.

(10) Patent No.: US 10,286,776 B2
(45) Date of Patent: May 14, 2019

(54) AIR DEFLECTOR ASSEMBLIES FOR VEHICLES

(71) Applicant: Toyota Motor Engineering & Manufacturing North America, Inc., Erlanger, KY (US)

(72) Inventors: Jeremiah T. Hammer, Ann Arbor, MI (US); Rahul B. Gururaj, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/613,803

(22) Filed: Jun. 5, 2017

(65) Prior Publication Data

US 2018/0345784 A1    Dec. 6, 2018

(51) Int. Cl.
*B60K 11/08*    (2006.01)
*B62D 35/00*    (2006.01)
*B60R 19/52*    (2006.01)
*B60R 19/48*    (2006.01)

(52) U.S. Cl.
CPC ............. *B60K 11/08* (2013.01); *B60R 19/48* (2013.01); *B60R 19/52* (2013.01); *B62D 35/005* (2013.01); *B60R 2019/486* (2013.01); *B60R 2019/527* (2013.01)

(58) Field of Classification Search
CPC ......... B60K 11/04; B60K 11/06; B60K 11/08; B60R 19/52; B60R 19/48; B60R 2019/486; B60R 2019/527
See application file for complete search history.

(56) References Cited

U.S. PATENT DOCUMENTS

| | | | | |
|---|---|---|---|---|
| 4,753,468 A | * | 6/1988 | Szymczak | B60R 19/52 180/68.6 |
| 4,944,540 A | * | 7/1990 | Mansoor | B60K 11/08 180/68.6 |
| 5,219,016 A | * | 6/1993 | Bolton | B60H 1/3227 165/140 |
| 5,403,048 A | * | 4/1995 | Ekladyous | B60R 19/52 248/298.1 |

(Continued)

FOREIGN PATENT DOCUMENTS

DE    102009060163 A1    6/2011
WO    2016095995 A1    6/2016

*Primary Examiner* — Frank B Vanaman
(74) *Attorney, Agent, or Firm* — Dinsmore & Shohl LLP

(57) ABSTRACT

A vehicle includes a grille assembly, a radiator, and a bumper reinforcement beam. In addition, the vehicle includes an air deflector assembly that further includes an air deflector body portion that extends away from the radiator in the vehicle longitudinal direction over the bumper reinforcement beam and toward the grille assembly. The air deflector body portion includes an upper wall portion and an intermediate wall portion. The intermediate wall portion intersects the upper wall portion at an angle. The air deflector body portion includes a lower wall portion that is offset from the upper wall portion in the vehicle lateral direction by the upper wall portion. The intermediate wall portion intersects the lower wall portion at an angle so to facilitate collapsing of the air deflector body portion upon a vertical impact by a leg impactor during a pedestrian leg impact test.

20 Claims, 12 Drawing Sheets

(56) References Cited

U.S. PATENT DOCUMENTS

| | | | |
|---|---|---|---|
| 6,447,049 B1 | 9/2002 | Tohda et al. | |
| 7,802,839 B2 | 9/2010 | Ajisaka | |
| 8,646,552 B2 | 2/2014 | Evans et al. | |
| 9,266,425 B2 | 2/2016 | Kawahira | |
| 2003/0192727 A1* | 10/2003 | Mori | B60K 11/04 180/68.4 |
| 2005/0022965 A1* | 2/2005 | Mori | B62D 25/084 165/76 |
| 2009/0159237 A1* | 6/2009 | Kuwabara | B60K 11/04 165/41 |
| 2011/0000728 A1* | 1/2011 | Mildner | B62D 25/084 180/68.1 |
| 2011/0057480 A1* | 3/2011 | Usoro | B60R 19/52 296/193.1 |
| 2013/0192801 A1* | 8/2013 | Leonard | B60K 11/08 165/109.1 |

\* cited by examiner

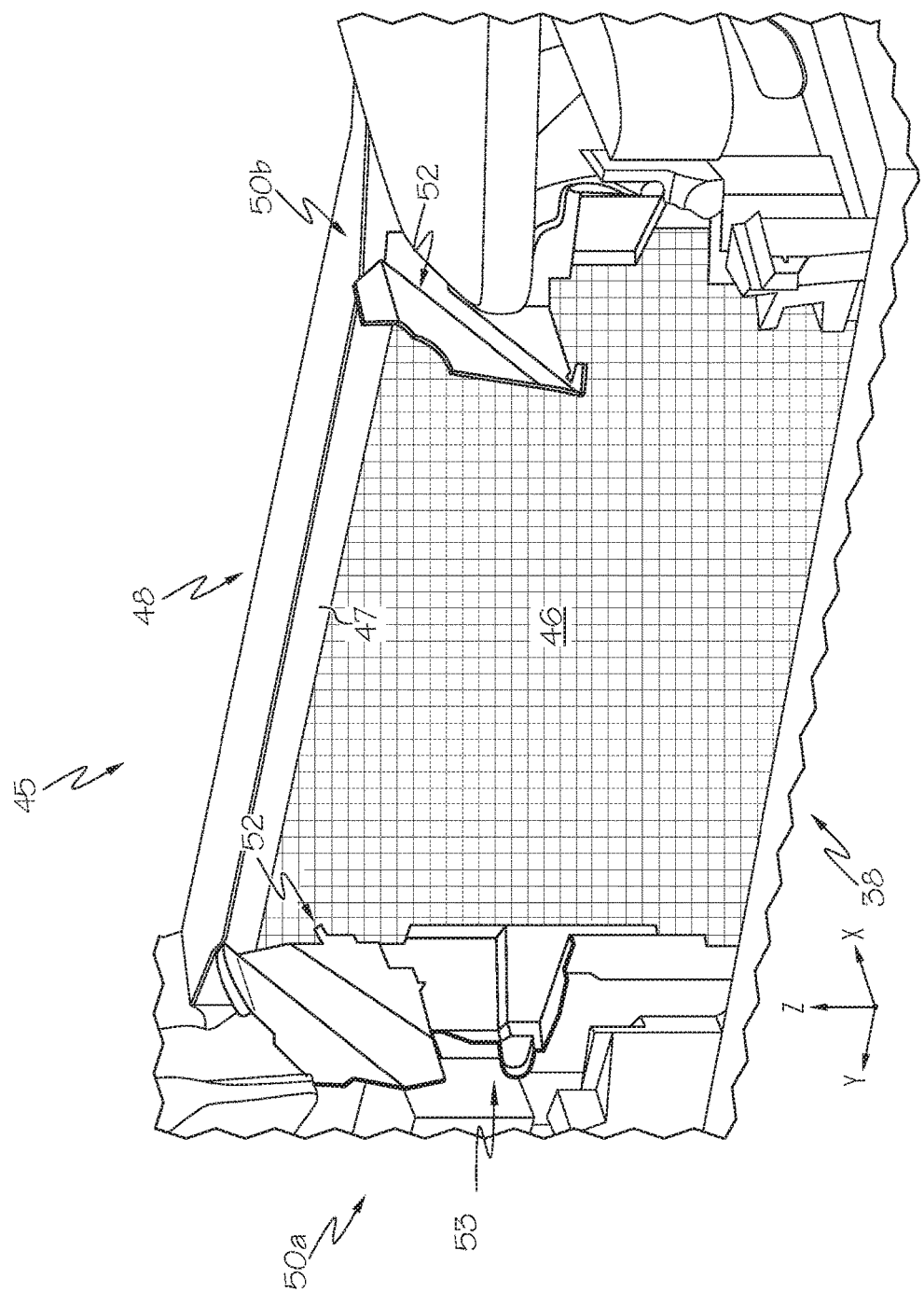

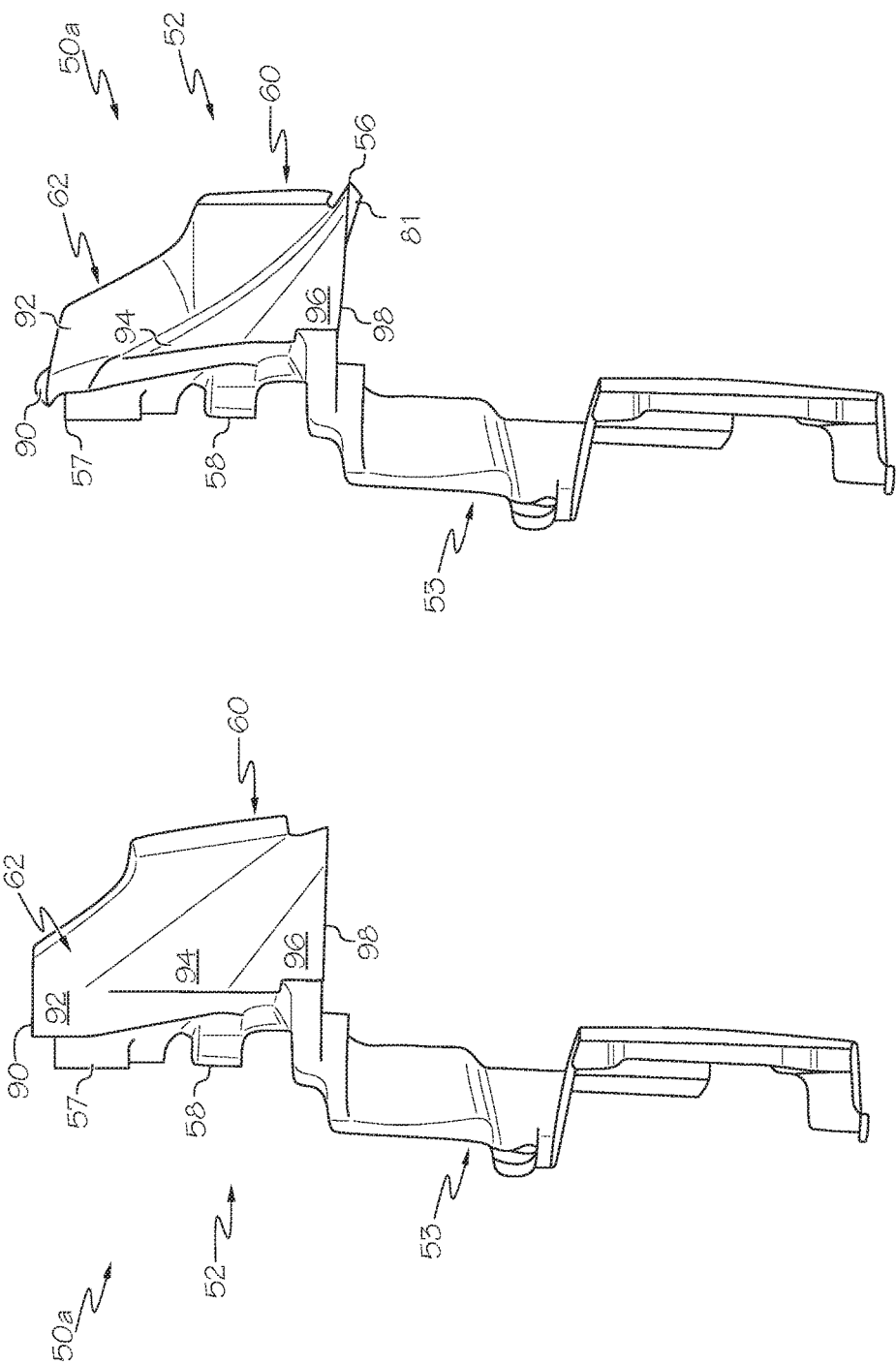

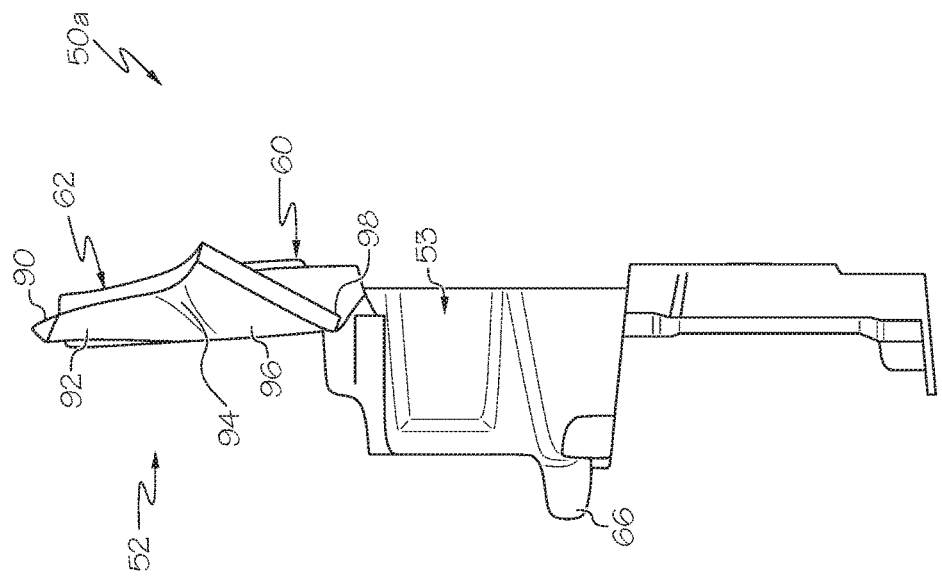
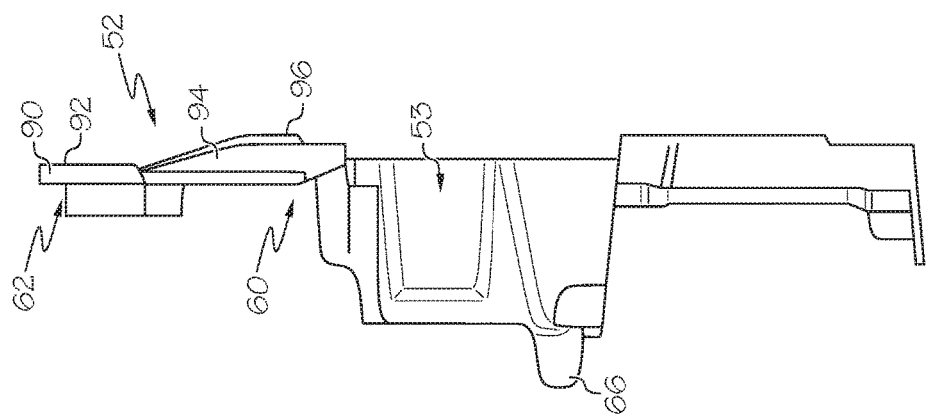

AIR DEFLECTOR ASSEMBLIES FOR VEHICLES

TECHNICAL FIELD

The present specification generally relates to air deflector assemblies and vehicles that include air deflector assemblies and, more specifically, air deflector assemblies that having impact deflecting features.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Such criteria can affect the rigidity or feel of the bumper assemblies.

A vehicle's engine compartment is typically cooled utilizing outside air flow. Inhibiting outside air from leaking into unwanted areas of the engine compartment can improve air flow toward desired areas of the engine compartment, such as in a direction of a radiator. Generally, air deflectors may be used to channel the outside air and to inhibit the cooler air from bypassing desired areas the engine compartment. However, presence of the air deflectors in the engine compartment can affect impact characteristics of the vehicle.

Accordingly, there is a need for air deflector assemblies that can channel outside air to the engine compartment while inhibiting cooler air from leaking out of areas, and provides for controlled energy absorption thus meeting pedestrian leg impact criteria.

SUMMARY

In one embodiment, a vehicle includes a grille assembly located at a front of the vehicle. A radiator is located rearward of the grille assembly in a vehicle longitudinal direction. A bumper reinforcement beam is located between the radiator and the grille assembly. The bumper reinforcement beam extends in a vehicle lateral direction. An air deflector assembly includes an air deflector body portion that extends away from the radiator in the vehicle longitudinal direction over the bumper reinforcement beam and toward the grille assembly. The air deflector body portion includes an upper wall portion and an intermediate wall portion extending toward the bumper reinforcement beam in a vehicle vertical direction. The intermediate wall portion intersects the upper wall portion at an angle.

In another embodiment, an air deflector assembly connects to a radiator support assembly of a vehicle. The air deflector assembly includes an air deflector body portion that extends away from a radiator in a vehicle longitudinal direction over a bumper reinforcement beam and toward a grille assembly to partition a region between the grille assembly and the radiator. The air deflector body portion includes an upper wall portion and an intermediate wall portion that extends toward the bumper reinforcement beam in a vehicle vertical direction. The intermediate wall portion intersects the upper wall portion at an angle.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 illustrates a front perspective view of the air deflector system of FIG. 2 without a bumper reinforcement and without the upper projecting bumper portion, according to one or more embodiments shown or described herein;

FIG. 7A illustrates a perspective side view of the air deflector assembly of FIG. 6B in isolation prior to impact, according to one or more embodiments shown and described herein;

FIG. 7B illustrates a perspective side view of the air deflector assembly of FIG. 6B in isolation post impact, according to one or more embodiments shown and described herein;

FIG. 8A illustrates a front view of the air deflector assembly of FIG. 7A in isolation prior to impact, according to one or more embodiments shown and described herein;

FIG. 8B illustrates a front view of the air deflector assembly of 7B in isolation post impact, according to one or more embodiments shown and described herein;

DETAILED DESCRIPTION

Vehicles according to the present specification include a hood edge area at a front end of the vehicle. Behind and below the hood edge area is a radiator assembly where the radiator assembly includes a radiator and a radiator support. The front end of the vehicle includes a front bumper assembly where the bumper assembly includes a bumper reinforcement beam that extends in a vehicle lateral direction. The bumper reinforcement beam is connected to side members of a vehicle frame that extend in a vehicle longitudinal direction. Below the hood edge area is an air deflector system, the system includes a first air deflector assembly and a second air deflector assembly. Both the air deflector assemblies are mounted on either side of the radiator and the air deflector assemblies can mirror each other. The air deflector system assists in the engine cooling process by channeling air into the radiator and the engine compartment by partitioning of a central area of the engine compartment while inhibiting cooler air from leaking out of the central area. The air deflector assemblies also provide for controlled energy absorption during leg impact testing in accordance with pedestrian leg impact criteria.

The air deflector assemblies each include an air deflector body portion and a connecting portion. The air deflector body portions extend over the bumper reinforcement beam and forward of the radiator assembly. The air deflector body portions are located at opposite sides of the radiator to support the radiator and engine compartment with outside air brought into the vehicle through a grille assembly.

The air deflector body portions extend forward from the radiator in a vehicle longitudinal direction with a forward portions of the air deflector body portion mounted to the bumper reinforcement. A rearward most portion of the air deflector body portions may be mounted to the radiator support. The air deflector body portions have an offset configuration where an upper portion of the air deflector body portions are offset in a vehicle lateral direction from a lower portion of the air deflector body portion. As a result of the offset configuration, the upper portion tends to deform more readily than without the offset configuration and thus absorbing energy created under pedestrian leg impact testing conditions. The air deflector body portions structure may be a single structure that are shaped to buckle rather than stack up or compress, which can provide additional energy absorption characteristics, as will be described in greater detail below.

Figure 1:
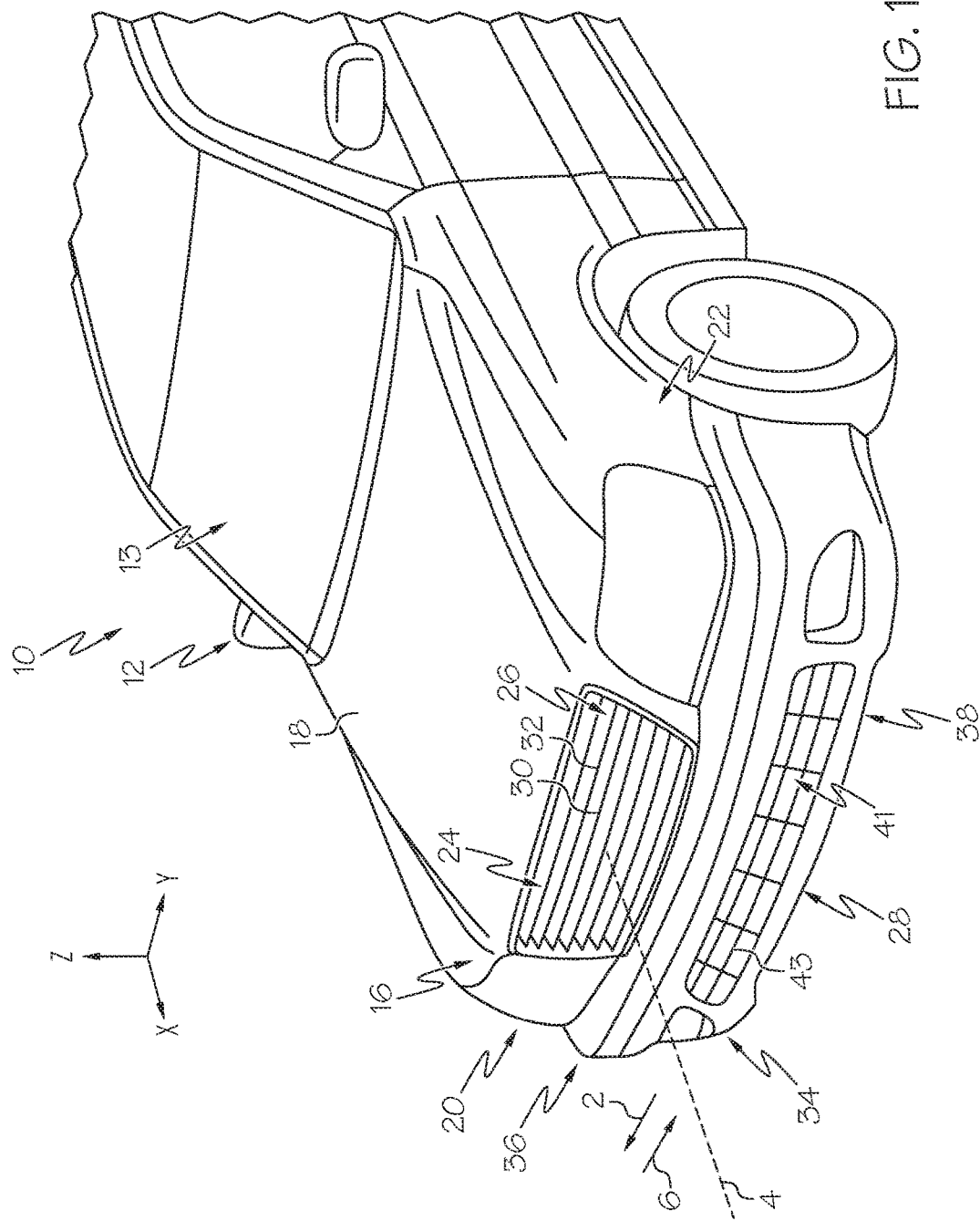
FIG. 1 schematically depicts a perspective view of a vehicle, according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning and/or deformation of the air deflector assembly of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," 4 "outboard" and "outward" refer may be mirrored about the vehicle centerline 4 when evaluating components positioned along opposite sides of the vehicle 10.

Referring initially to FIG. 1, a perspective view of a vehicle 10 is depicted. The vehicle 10 includes a vehicle body 12 onto which a vehicle drivetrain is coupled. The vehicle 10 also includes a cabin 13 that is integral with the vehicle body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 includes a covering portion 30 with a number of grille deflectors 32, a mesh or other suitable covering that protects a radiator 46 supported by a radiator support assembly 48 behind the covering portion 30, while allowing air to flow past the covering and over the radiator 46. The front end assembly 16 includes an outer covering or front fascia 34, an upper projecting bumper portion 36 and a lower projecting bumper portion 38 that under hangs the upper projecting bumper portion 36. The lower grille assembly 28 may include a covering portion 41 with a number of grille deflectors 43 and be located between the upper projecting bumper portion 36 and the lower projecting bumper portion 38.

Figure 2:
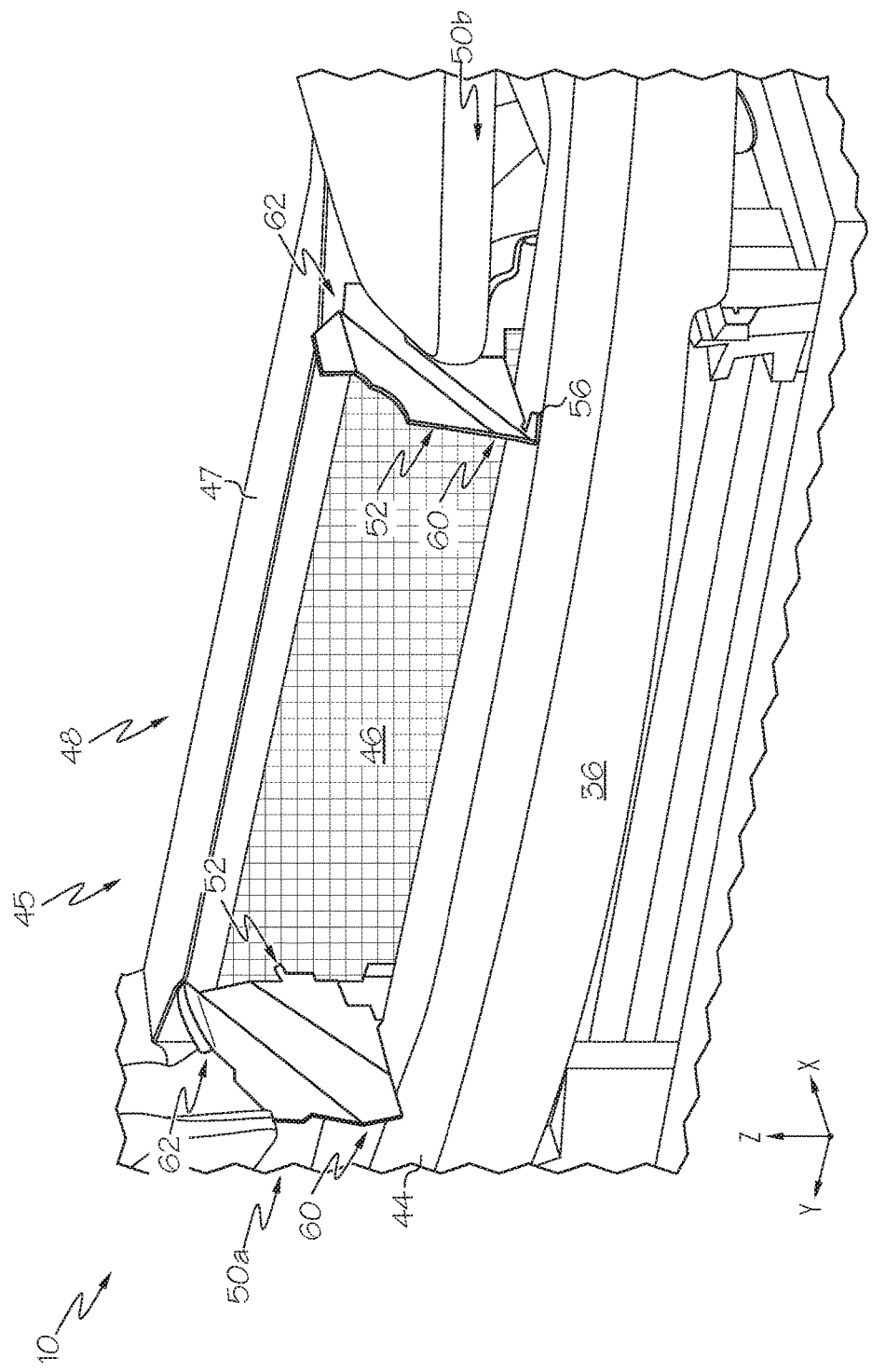
FIG. 2 illustrates a front perspective view of an air deflector system for the vehicle of FIG. 1 is shown with the hood, the front fenders, the upper grill assembly, the lower grill assembly, and the front fascia removed, according to one or more embodiments shown or described herein.

Referring to FIG. 2, a front perspective view of an air deflector system 45 for the vehicle 10 of FIG. 1 is shown with the hood 18, the front fenders 20, 22, the upper grille assembly 24, the lower grille assembly 28, and the front fascia 34 removed. The vehicle includes a bumper reinforcement beam 44 that extends generally in the vehicle lateral direction between the front fenders 20 and 22. Both a radiator 46 and a radiator support assembly 48 are located between the front fenders 20 and 22 and are disposed behind the bumper reinforcement beam 44.

Extending in an outwardly direction from the radiator 46 and the radiator support assembly 48 in a vehicle longitudinal direction is an air deflector system 45. The air deflector system 45 includes a pair of air deflector assemblies 50a, 50b. The air deflector assemblies 50a, 50b extend in a vehicle vertical direction between the lower grille assembly 28 and a top wall 47 of the radiator support assembly 48. Each air deflector assembly 50a, 50b includes an air deflector body portion 52 and a connecting portion 53 (see FIG. 4).

The air deflector body portions 52 are disposed above the bumper reinforcement beam 44 and in front of the radiator support assembly 48. The air deflector body portions 52 are located at opposite sides of the radiator 46 to support the radiator 46 and engine compartment with outside air brought into the vehicle through the upper grille assembly 24. The air deflector body portion 52 has a forward portion 60 and a rearward portion 62. Further, the air deflector body portion 52 extends in the vehicle longitudinal direction away from the radiator 46 where the forward portion 60 may be mounted to the bumper reinforcement beam 44 at attachment 56 and the rearward portion 62 may be mounted to the top wall 47 of the radiator support assembly 48. It should be appreciated that attachment 56 may be configured as a fastener such as a push clip, a christmas tree insert, or any other retainer that can hold the air deflector body portion 52 to the bumper reinforcement beam 44 and the radiator support assembly 48.

It should be appreciated that while the air deflector system 45 comprises a pair of air deflector assemblies 50a, 50b, only the right side air deflector assembly 50a of the pair of air deflector assemblies 50a, 50b is described for simplicity. The left side air deflector assembly 50b may be a mirror of the air deflector assembly being described.

Figure 3A:
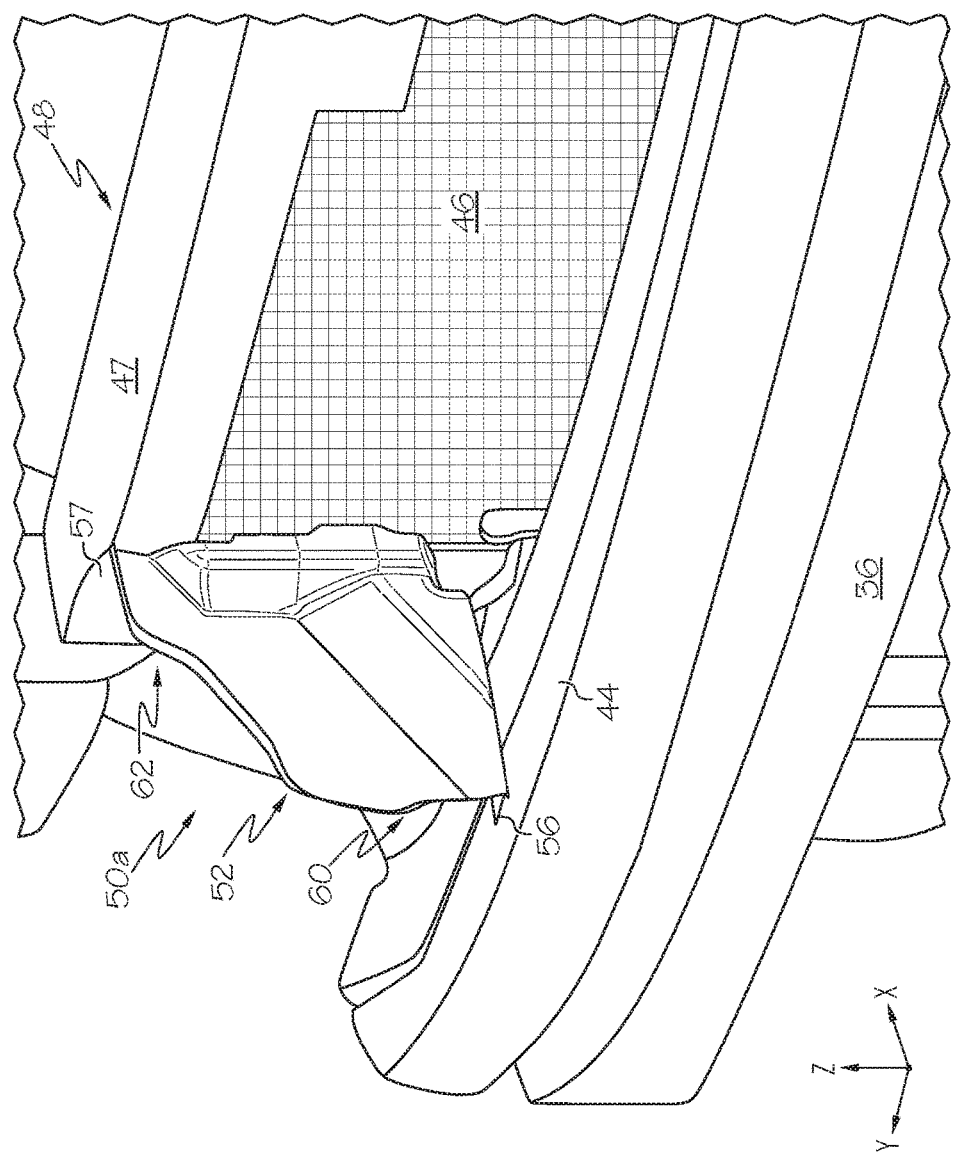
FIG. 3A illustrates an outboard perspective view of an air deflector body portion of the air deflector system of FIG. 2, according to one or more embodiments shown and described herein.
Figure 3B:
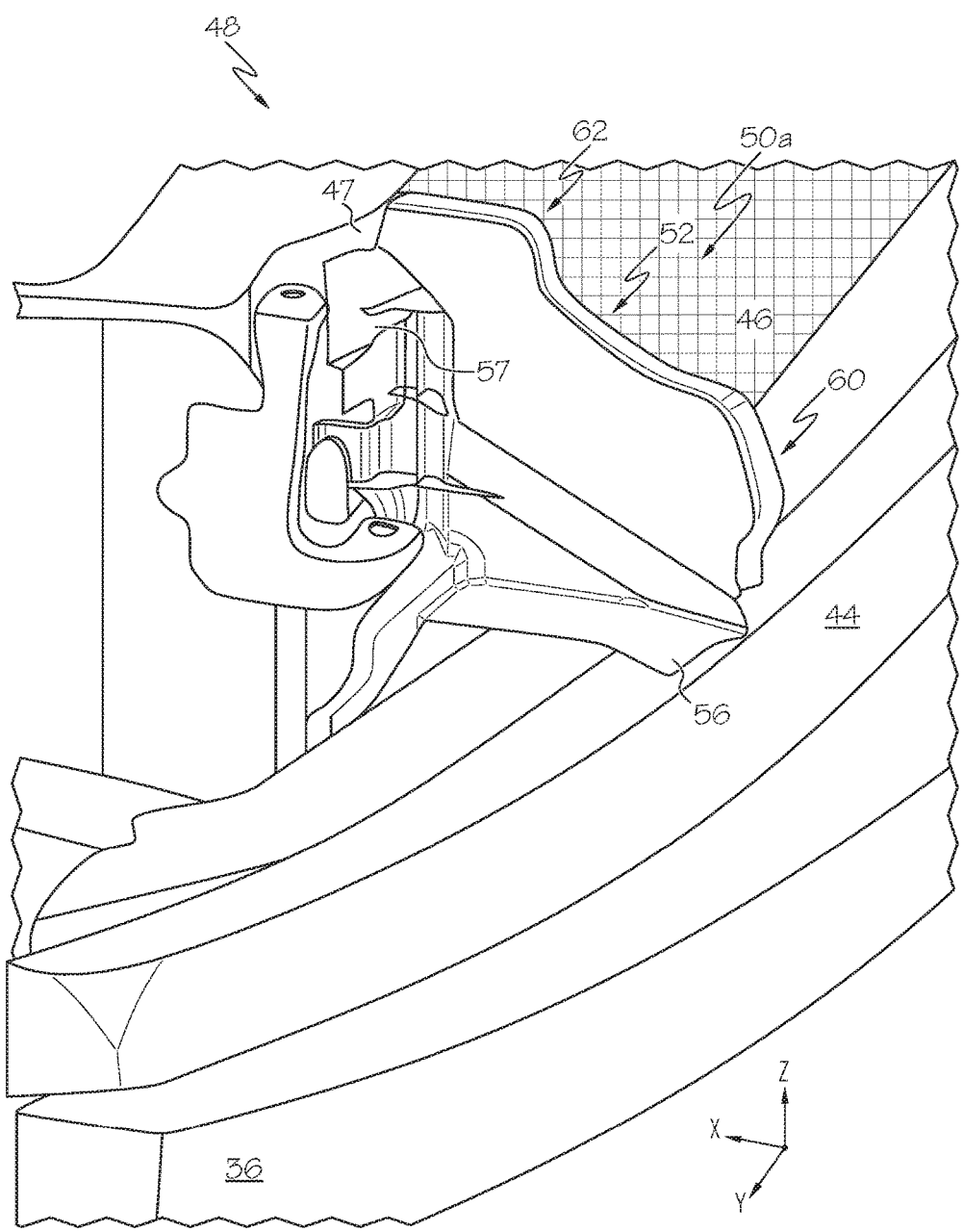
FIG. 3B illustrates an inboard perspective view of the air deflector body portion of FIG. 3A, according to one or more embodiments shown and described herein.

Referring to FIGS. 3A and 3B, an outboard and an inboard perspective views of the air deflector system 45 of FIG. 2 are illustrated. The air deflector body portion 52 is illustrated to show that the air deflector body portion 52 extends in a vehicle longitudinal direction extending away from the radiator 46 where the forward portion 60 extends across the top surface of the bumper reinforcement beam 44 and can be mounted to the bumper reinforcement beam 44 at attachment 56. The rearward portion 62 of the air deflector body portion 52 extends in a vehicle vertical direction to the top surface of the top wall 47 of the radiator support assembly 48. Further structure of the air deflector body portion 52 is discussed below.

Referring now to FIG. 4, a front perspective view of the air deflector system 45 of FIG. 2, is shown without the bumper reinforcement beam 44 and without the upper projecting bumper portion 36. The connecting portion 53 of the air deflector assembly 50a is disposed behind the bumper reinforcement beam 44 and extends in the vehicle vertical direction downward beyond the bumper reinforcement beam 44. The connecting portion 53 connects to the air deflector body portion 52 and the radiator support assembly 48.

Figure 5:
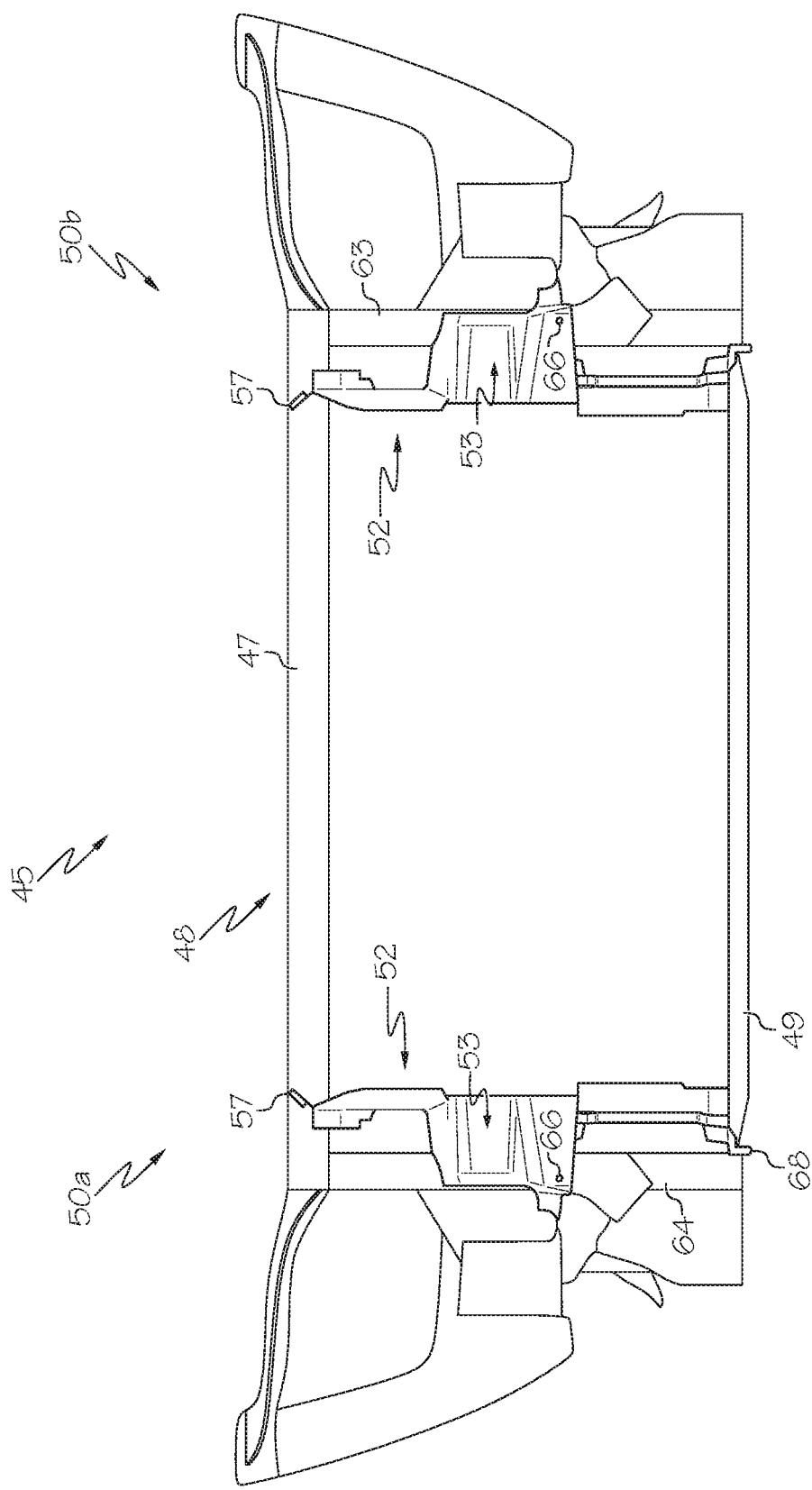
FIG. 5 illustrates a front view of the air deflector system of FIG. 2 without a bumper reinforcement, without the upper projecting bumper portion, and without the radiator is depicted, according to one or more embodiments shown and described herein.

Referring to FIG. 5, a front view of the air deflector system 45 of FIG. 2 without the bumper reinforcement beam 44, without the upper projecting bumper portion 36, and without the radiator 46 is depicted. The radiator support assembly 48 has a pair of opposing side walls 63, 64 that extend in the vehicle vertical direction, a top wall 47 and an opposing bottom wall 49 that extend in the vehicle lateral direction between the side walls 63, 64. The radiator support assembly 48 surrounds and supports the radiator 46. The air deflector assembly 50a extends along the height of the side wall 64 and the connecting portion 53 has a locating pin 68 that extends beyond the bottom wall 49 of the radiator support assembly 48. The air deflector body portion 52 has an attachment 57 that extends beyond the rearward portion in the vehicle vertical direction so to attach the air deflector body portion 52 to the top wall 47 of the radiator support assembly 48. It should be appreciated that the attachment 57 and the locating pin 68 may be configured as a fastener such as a push clip, a christmas tree insert, or any other retainer or fastener that can hold the air deflector body portion 52 to the top wall 47 and the connecting portion 53 to the bottom wall 49.

The connecting portion 53 is attached to the side wall 64 of the radiator support assembly 48 also by attachment bore 66. It should be appreciated that the attachment bore 66 may be configured to accept a push clip, a christmas tree insert, or any other retainer that can hold the connecting portion 53 to the side wall 64. The width of the connecting portion 53 in the vehicle lateral direction may vary. Moreover, the height of the air deflector body portion 52 in vehicle vertical direction may vary therefore it should be appreciated that the connecting portion 53 height may also change.

Figure 6A:
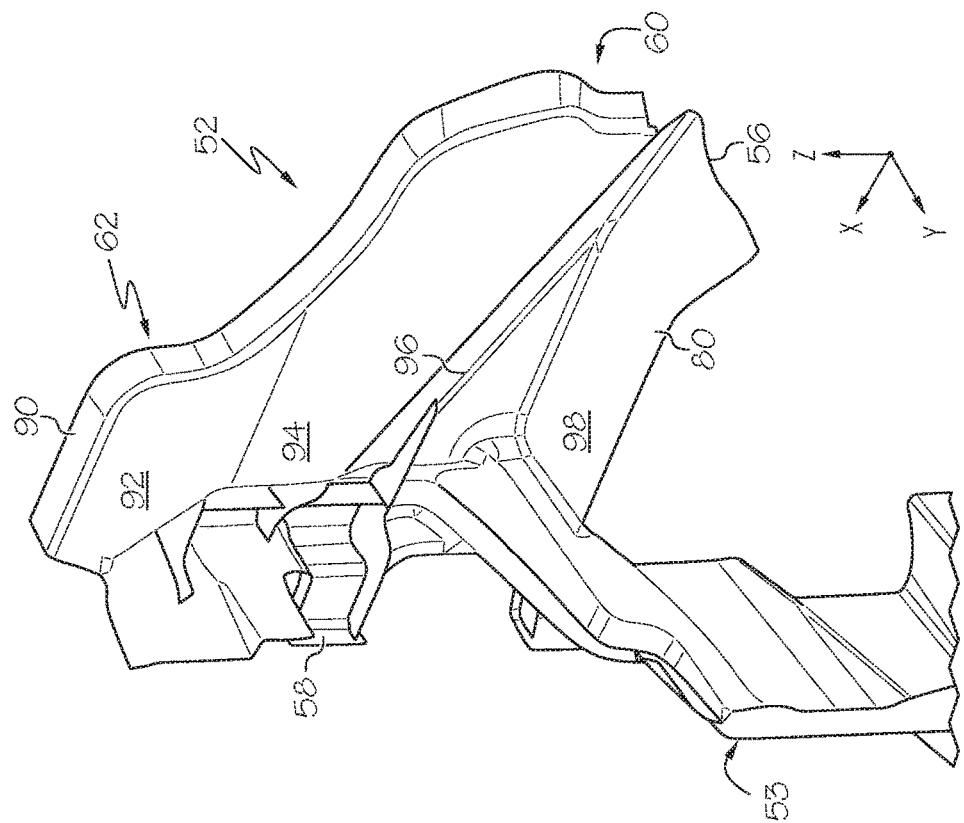
FIG. 6A illustrates an outboard perspective view of the air deflector body portion of FIG. 2 in isolation, according to one or more embodiments shown and described herein.
Figure 6B:
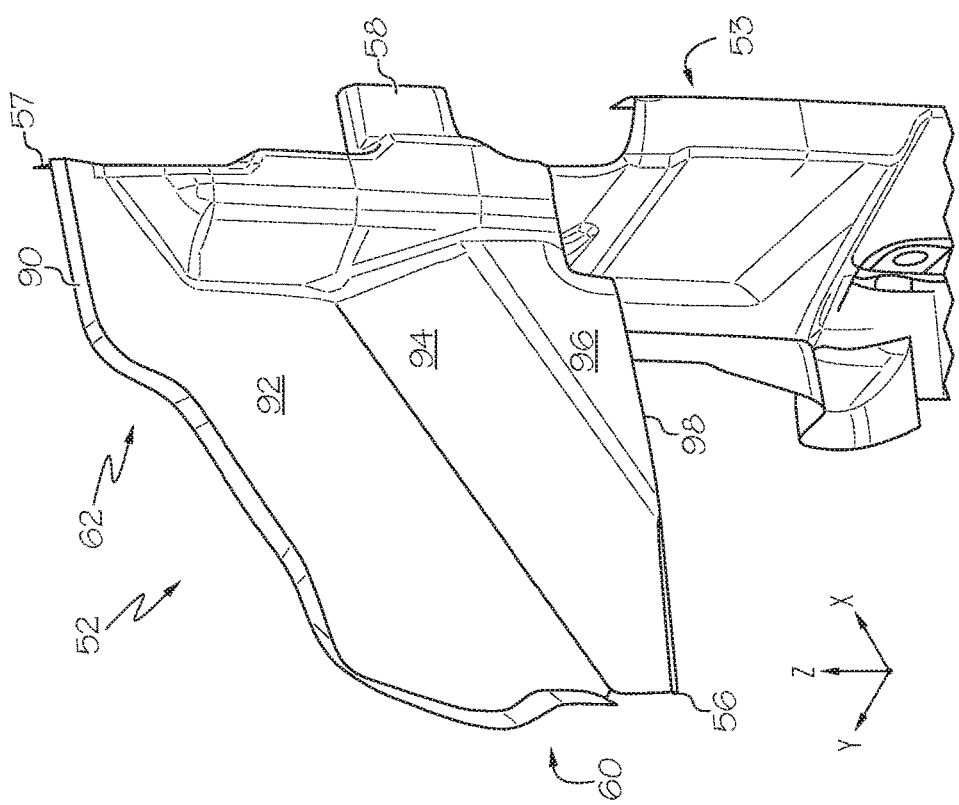
FIG. 6B illustrates a inboard prospective view of the air deflector body portion of FIG. 6A in isolation, according to one or more embodiments shown and described herein.

FIGS. 6A and 6B illustrate outboard and inboard perspective views of the air deflector body portion 52 of FIG. 2 in isolation. The air deflector body portion 52 has the rearward portion 62 and the forward portion 60, both of which are comprised of walls and flanges that will now be described in detail. The rearward portion 62 includes an upper wall portion 92 with a first flange 90 that extends outwardly from an upper edge 70 of the upper wall portion 92 in the vehicle lateral direction, an intermediate wall portion 94, and a lower wall portion 96 with a second flange 98 that extends outwardly from a lower edge 72 of the lower wall portion in the vehicle lateral direction. The second flange 98 has a top surface 80 and a bottom surface 81. The upper wall portion 92 and first flange 90 are separated vertically from the lower wall portion 96 and second flange 98 by the intermediate wall portion 94. The intermediate wall portion 94 extends at an angle and intersects the upper wall portion 92 and the lower wall portion 96. The intermediate wall portion 94 extends forward into the forward portion 60 in the vehicle longitudinal direction beyond the lower wall portion 96. The rearward portion 62 has a tab 58 that is configured to interact with the side wall 64 of the radiator support assembly 48 to provide support to air deflector body portion 52.

The forward portion 60 includes the upper wall portion 92 with the first flange 90 and the intermediate wall portion 94 with the second flange 98. The upper wall portion 92 and first flange 90 of the forward portion 60 are separated vertically by the intermediate wall portion 94 of the forward portion 60. The intermediate wall portion 94 of the forward portion 60 extends at an angle and intersects the upper wall portion 92 and the second flange 98 of the forward portion 60.

The upper wall portion 92 and the lower wall portion 96 of the rearward portion 62 are both substantially planar. Moreover, the upper wall portion 92 of the rearward portion 62 is substantially parallel to the lower wall portion 96 of the rearward portion 62. The first flange 90 of the air deflector body portion 52 has a top surface 74, the top surface 74 forms a sealing flange that travels from the rearward portion 62 to the forward portion 60 in a vehicle longitudinal direction. The top surface 74 has a first corner 76 and a second corner 78. The first corner 76 may be an acute angle while the second corner 78 may be an obtuse angle. The top surface 74 borders a headlight or other vehicle part where colder air may leak out. The top surface 74 allows for a sealing foam (not shown) to be applied which does not change or inhibit the deformation characteristics of the air deflector body portion 52 described below.

The upper wall portion 92 of the forward portion 60 is offset from the lower wall portion 96 of the rearward portion 62 in the vehicle lateral direction by the intermediate wall portion 94 extending between the upper wall portion 92 and the lower wall portion 96. The angle of the intermediate wall portion 94 is so as to offset the upper wall portion 92 from the lower wall portion 96 in the vehicle lateral direction thus assisting in deformation of the air deflector body portion 52 because there is reduced vertical resistance to a vertical impact force throughout the air deflector body portion 52. Moreover, the upper wall portion 92 of the air deflector body portion 52 is tapered in height from the rearward portion 62 to the forward portion 60 which can also assist in deformation of the air deflector body portion 52 upon impact.

The air deflector body portion 52 upper wall portion 92 is offset laterally from the lower wall portion 96. This configuration tends to provide the air deflector body portion 52 with decreased stiffness in response to a vertically applied impact force than if aligned vertically with the lower wall portion 96 and/or the intermediate wall portion 94. The offset feature offsets the vertical load path resulting in less resistance by the air deflector body portion 52 in leg impactor testing. Further, the offset feature allows for rotation of the air deflector body portion 52 when a vertical load is applied. In other words, the air deflector body portion 52 bends more readily at the upper wall portion 92 because of the offset intermediate wall portion 94 thus relocating the energy stresses inboard and toward the radiator 46 and radiator support assembly 48 so that the energy can be absorbed resulting in less force exerted on a leg impactor.

Shown by FIGS. 7A and 7B, a perspective side view of the air deflector assembly 50*a* prior (FIG. 7A) and post impact (FIG. 7B) and FIGS. 8A and 8B a front view of a prior (FIG. 8A) and a post impact (FIG. 8B) are illustrated. As discussed above, the forward portion 60 and the rearward portion 62 deform upon an impact. As the wall portions 92, 94, 96 of the forward portion 60 and rearward portion 62 deform, the greatest deformation may occur in the upper wall portion 92 and first flange 90 of the rearward portion 62 and the intermediate wall portion 94 and second flange 98 of the forward portion 60. This deformation configuration results in the air deflector body portion 52 collapsing onto itself or bending into the radiator 46 thus moving the stress away from the point of impact.

Figure 10:
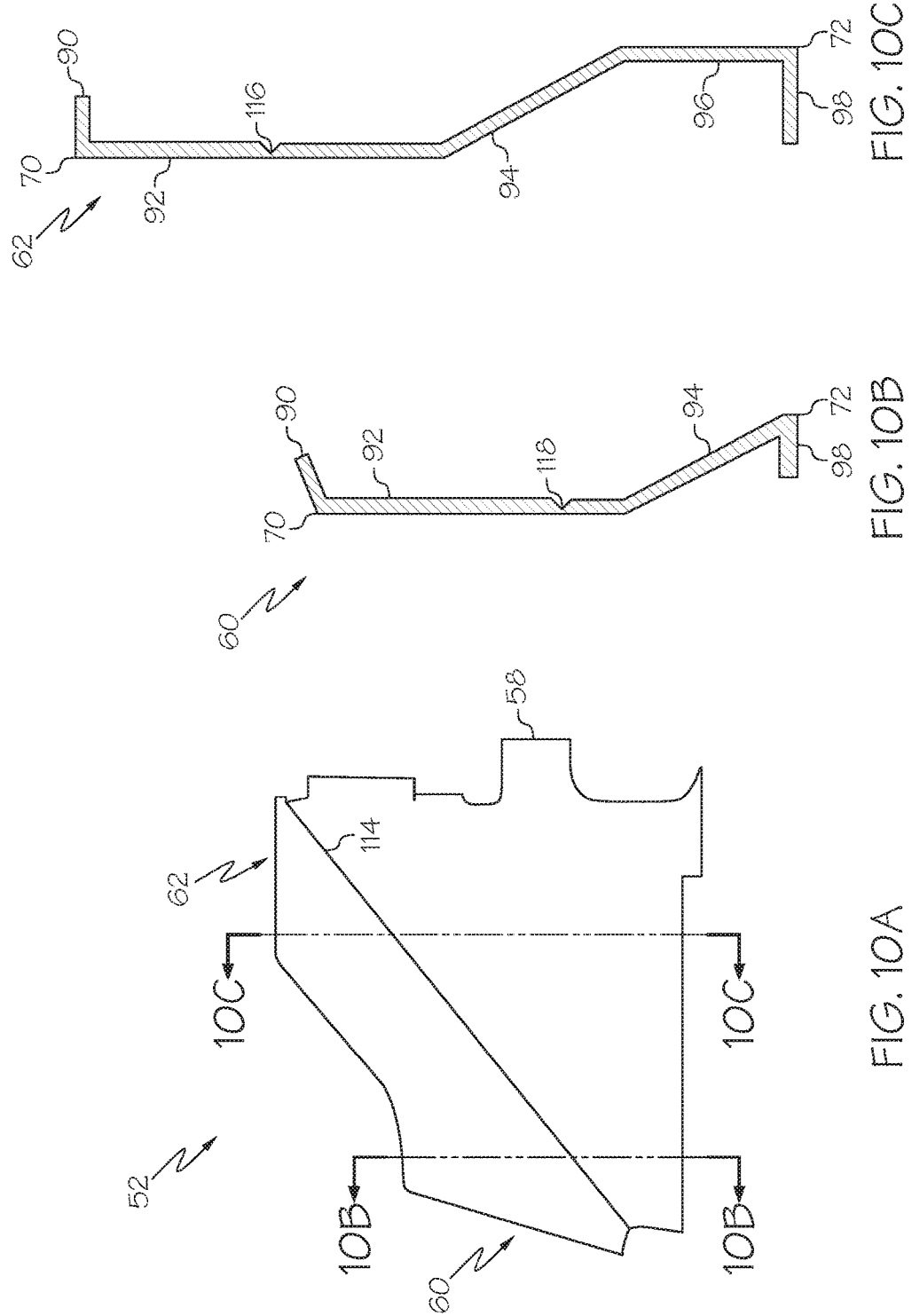
FIG. 10A illustrates a partial side view of another embodiment of an air deflector body portion including a line of weakness, according to one or more embodiments shown and described herein.
FIG. 10B illustrates a partial cross sectional view along line 10B-10B of FIG. 10A, according to one or more embodiments shown and described herein.
FIG. 10C illustrates a partial cross sectional view along line 10C-10C of FIG. 10A, according to one or more embodiments shown and described herein.

Referring to FIGS. 10A, 10B, and 10C from the partial side view and the partial cross section view of the air deflector body portion 52 taken from line 10B-10B and 10C-10C, the offset of the lower wall portion 96 from the upper wall portion 92 in the vehicle lateral direction by the upper wall portion 92 can be seen. It can also be seen that the intermediate wall portion 94 intersects the lower wall portion 96 at an angle. Moreover, the intermediate wall portion 94 extends forward into the forward portion 60 in the vehicle longitudinal direction beyond the lower wall portion 96. The upper wall portion 92 is substantially parallel to the lower wall portion 96. The cross sectional view also illustrates where the first flange 90 extends outwardly from the upper edge 70 of the upper wall portion 92 in the vehicle lateral direction and the second flange 98 extends outwardly from a lower edge 72 of the lower wall portion 96 in the vehicle lateral direction.

Still referring to FIGS. 10A, 10B, and 10C, it can be seen that in some embodiments, the upper wall portion 92 may also include an obliquely angled line of weakness 114 that extends from the forward portion 60 to the rearward portion 62. The line of weakness comprises a thinner plastic region or notch 116, 118 formed into the air deflector body portion 52. Moreover, in embodiments having a line of weakness 114, the line of weakness 114 is a line of stress concentration that can provide even greater predictability and thus even further reduced stresses at the point of impact.

Figure 9:
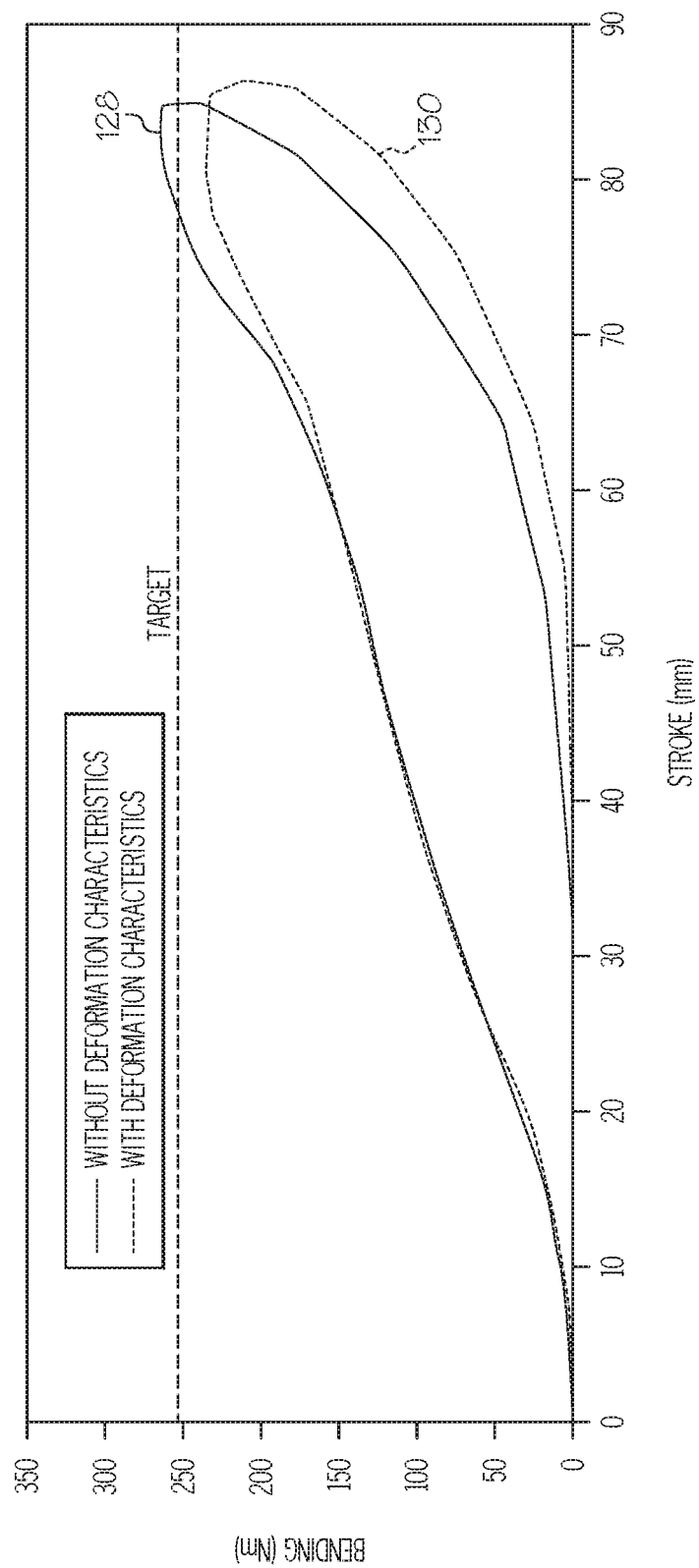
FIG. 9 is a graphical representation of the amount of bend exerted on the leg impactor versus the amount of stroke of the air deflector body assembly present during a pedestrian leg impact test, according to one or more embodiments shown and described herein.

Referring to FIG. 9, a graphical representation of the amount of bend exerted on the leg impactor versus the amount of stroke of the air deflector assembly 50*a* present during a pedestrian leg impact test is shown. Solid line 128 represents the force versus stroke experienced by the pedestrian leg impactor with an air deflector assembly without the offset deformation feature described above. The dashed line 130 represents the force versus stroke experienced by the pedestrian leg impactor with the air deflector assembly 50*a* having the offset deformation feature described above. As represented by solid line 128, the amount of bending movement present using the air deflector assembly without the deformation feature at the leg impactor was above a target range. On the other hand, the amount of bending movement present using the air deflector assembly 50*a* with the deformation feature at the leg impactor was less than the maximum target for the amount of force acceptable to be exerted onto the leg impactor. Further, the presence of the deformation features in the air deflector assembly 50*a* also substantially increased the amount of stroke or deformation measured in the air deflector assembly 50*a* resulting in the impact forces being channeled away from the leg impactor.

Figure 11:
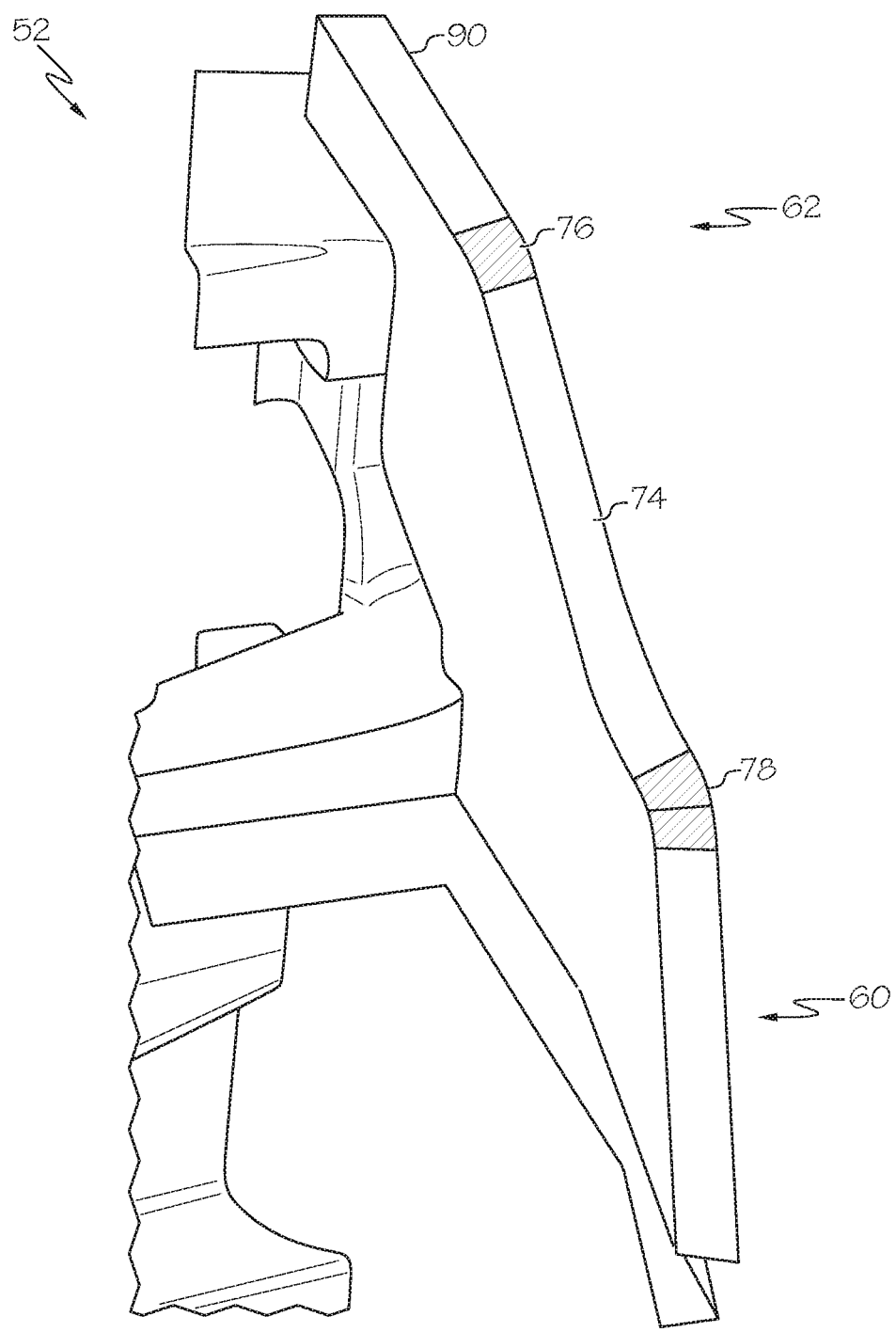
FIG. 11 illustrates a front perspective view of the air deflector body portion of FIG. 6B in isolation, according to one or more embodiments shown and described herein

Referring to FIG. 11, a front perspective view of the air deflector body portion 52 in isolation of the air deflector system of FIG. 2 is illustrated. In some embodiments, the first corner 76 and the second corner 78 of the top surface 74 of the first flange 90 may have the width of the first flange 90 reduced so to allow for more distortion or bend upon an impact. Alternatively, the first corner 76 and the second corner 78 of the top surface 74 of the first flange 90 may have the depth of the corners 76, 78 reduced in a vehicle longitudinal direction so as to reduce the length of the first flange 90 so to allow for more distortion or bend upon an impact.

The air deflector body portion 52 may be a single, unitary structure that is shaped to buckle rather than stack up or compress, which can provide additional energy absorption characteristics. The air deflector body portion 52 may be made of a plastic material such as, without limitation, ethylene-propylene terpolymer (EPT) which is advantageous in a vehicle for several reasons including, without limitation, the air deflector body portion 52 provides enough deflection to direct the colder air into the wanted areas of the engine compartment. Furthermore, the air deflector body portion 52 may seal an upper area of the vehicle such as the headlight area to inhibit colder air from leaking and may be used in conjunction with sealing foam. Moreover, the air deflector body portion 52 has deformable characteristics upon impact.

The above-described air deflector assembly is used to absorb energy from a pedestrian leg impactor during pedestrian leg impact testing. The air deflector assembly comprises an air deflector body portion, a connecting portion, and a seal flange portion. The assembly is located between a relatively hard bumper reinforcement beam and the radiator and/or radiator support. During the pedestrian leg impact testing, the air deflector assembly may distort toward the radiator and the radiator support as the air deflector assembly deforms due to contact with the pedestrian leg impactor. As the air deflector assembly controllably deforms, the amount of energy that is being absorbed reduces pedestrian leg injuries caused from the leg impactor.

It is noted that the term "about" may be utilized herein to represent the inherent degree of uncertainty that may be attributed to any quantitative comparison, value, measurement, or other representation. The term are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a grille assembly located at a front of the vehicle;

a radiator located rearward of the grille assembly in a vehicle longitudinal direction;

a bumper reinforcement beam that is located between the radiator and the grille assembly, the bumper reinforcement beam extending in a vehicle lateral direction, the bumper reinforcement beam having a front surface that extends in a vehicle vertical direction; and an air deflector assembly including an air deflector body portion that extends away from the radiator in the vehicle longitudinal direction over the bumper reinforcement beam and toward the grille assembly, the air deflector body portion including a lower wall portion, an upper wall portion and an intermediate wall portion, the upper wall portion and the intermediate wall portion extending toward the bumper reinforcement beam in the vehicle vertical direction, the intermediate wall portion intersecting the upper wall portion at an angle, the lower wall portion is above the front surface of the bumper reinforcement beam in the vehicle vertical direction and terminates behind the front surface of the bumper reinforcement beam in the vehicle longitudinal direction, the air deflector body portion has a forward portion and a rearward portion, the air deflector body portion includes a line of weakness of reduced material thickness that extends between the forward portion and the rearward portion at an angle relative to the vehicle longitudinal direction.

2. The vehicle of claim 1, wherein the lower wall portion being offset from the upper wall portion in the vehicle lateral direction by the intermediate wall portion.

3. The vehicle of claim 2, wherein the intermediate wall portion intersects the lower wall portion at an angle.

4. The vehicle of claim 2, wherein the upper wall portion is substantially planar and the lower wall portion is substantially planar.

5. The vehicle of claim 4, wherein the upper wall portion is substantially parallel to the lower wall portion.

6. The vehicle of claim 2, wherein the lower wall portion is located at the rearward portion, the intermediate wall portion extending forward into the forward portion in the vehicle longitudinal direction beyond the lower wall portion.

7. The vehicle of claim 2, wherein the air deflector body portion includes a first flange that extends outwardly from an upper edge of the upper wall portion in the vehicle lateral direction.

8. The vehicle of claim 7, wherein the air deflector body portion includes a second flange that extends outwardly from a lower edge of the lower wall portion in the vehicle lateral direction.

9. The vehicle of claim 1 further comprising a radiator support assembly that supports the radiator, the air deflector assembly being connected to the radiator support assembly.

10. The vehicle of claim 1, wherein the air deflector assembly is a first air deflector assembly, the vehicle further comprising a second air deflector assembly spaced from the first air deflector assembly in the vehicle lateral direction, the second air deflector assembly including an air deflector body portion that extends away from the radiator in the vehicle longitudinal direction over the bumper reinforcement beam and toward the grille assembly, the air deflector body portion of the second air deflector assembly including an upper wall portion and an intermediate wall portion, the intermediate wall portion of the second air deflector assembly intersecting the upper wall portion of the second air deflector assembly at an angle.

11. The vehicle of claim 1, wherein the line of weakness of reduced material thickness is an oblique angle.

12. The vehicle of claim 1, wherein the line of weakness of reduced material thickness includes at least one notch, the at least one notch provides a predetermined collapsible area of the air deflector body portion.

13. An air deflector assembly that connects to a radiator support assembly of a vehicle, the air deflector assembly comprising an air deflector body portion that extends away from a radiator in a vehicle longitudinal direction over a bumper reinforcement beam and toward a grille assembly to partition a region between the grille assembly and the radiator, the air deflector body portion including a lower wall portion, an upper wall portion and an intermediate wall portion, the upper wall portion and the intermediate wall portion extend toward the bumper reinforcement beam in a vehicle vertical direction, the intermediate wall portion intersecting the upper wall portion at an angle, the lower wall portion is above a front surface of the bumper reinforcement beam in the vehicle vertical direction and terminates behind the front surface of the bumper reinforcement beam in the vehicle longitudinal direction, the air deflector body portion has a forward portion and a rearward portion, the air deflector body portion includes a line of weakness of reduced material thickness that extends between the forward portion and the rearward portion at an angle relative to the vehicle longitudinal direction.

14. The air deflector assembly of claim 13, the lower wall portion being offset from the upper wall portion in a vehicle lateral direction by the intermediate wall portion.

15. The air deflector assembly of claim 14, wherein the intermediate wall portion intersects the lower wall portion at an angle.

16. The air deflector assembly of claim 14, wherein the upper wall portion is substantially planar and the lower wall portion is substantially planar.

17. The air deflector assembly of claim 16, wherein the upper wall portion is substantially parallel to the lower wall portion.

18. The air deflector assembly of claim 14, wherein the lower wall portion is located at the rearward portion, the intermediate wall portion extending forward into the forward portion in the vehicle longitudinal direction beyond the lower wall portion.

19. The air deflector assembly of claim 14, wherein the air deflector body portion includes a first flange that extends outwardly from an upper edge of the upper wall portion in the vehicle lateral direction.

20. The air deflector assembly of claim 19, wherein the air deflector body portion includes a second flange that extends outwardly from a lower edge of the lower wall portion in the vehicle lateral direction.

* * * * *